United States Patent
Stählin

(10) Patent No.: US 11,491,998 B2
(45) Date of Patent: Nov. 8, 2022

(54) METHOD FOR DETERMINING THE VALUES OF PARAMETERS

(71) Applicant: Continental Teves AG & Co. oHG, Frankfurt am Main (DE)

(72) Inventor: Ulrich Stählin, Nuremberg (DE)

(73) Assignee: CONTINENTAL TEVES AG & CO. OHG, Frankfurt am Main (DE)

(*) Notice: Subject to any disclaimer, the term of this patent is extended or adjusted under 35 U.S.C. 154(b) by 327 days.

(21) Appl. No.: 16/756,619

(22) PCT Filed: Sep. 21, 2018

(86) PCT No.: PCT/EP2018/075597
§ 371 (c)(1),
(2) Date: Apr. 16, 2020

(87) PCT Pub. No.: WO2019/076579
PCT Pub. Date: Apr. 25, 2019

(65) Prior Publication Data
US 2022/0153287 A1    May 19, 2022

(30) Foreign Application Priority Data
Oct. 19, 2017 (DE) ................ 10 2017 218 703.4

(51) Int. Cl.
*B60W 50/04* (2006.01)
*G07C 5/02* (2006.01)
*B60W 50/00* (2006.01)

(52) U.S. Cl.
CPC ............ *B60W 50/045* (2013.01); *G07C 5/02* (2013.01); *B60W 2050/0018* (2013.01); *B60W 2520/10* (2013.01); *B60W 2520/105* (2013.01); *B60W 2520/12* (2013.01); *B60W 2520/125* (2013.01); *B60W 2520/14* (2013.01); *B60W 2520/18* (2013.01); *B60W 2520/20* (2013.01); *B60W 2520/28* (2013.01); *B60W 2530/10* (2013.01);
(Continued)

(58) Field of Classification Search
CPC ...................................................... G07C 5/02
See application file for complete search history.

(56) References Cited

U.S. PATENT DOCUMENTS

| 5,948,033 A | 9/1999 | Baer et al. |
| 2013/0226417 A1* | 8/2013 | Tessier, Jr. ............ F16H 61/00 701/59 |

(Continued)

FOREIGN PATENT DOCUMENTS

| AT | 504941 A2 | 9/2008 |
| DE | 19506296 C1 | 4/1996 |

(Continued)

OTHER PUBLICATIONS

German Search Report for German Application No. 10 2017 218 703.4, with partial translation, dated May 15, 2018, 9 pages.

(Continued)

*Primary Examiner* — Jeff A Burke
*Assistant Examiner* — Jerrod Irvin Davis
(74) *Attorney, Agent, or Firm* — RatnerPrestia

(57) ABSTRACT

A method for determining the values of parameters for a controller of a vehicle, wherein respective error measures are calculated for different sets of values and a set of values is selected based on the error measures.

13 Claims, 1 Drawing Sheet

(52) U.S. Cl.
CPC ... *B60W 2530/16* (2013.01); *B60W 2530/201* (2020.02); *B60W 2556/50* (2020.02)

(56) References Cited

U.S. PATENT DOCUMENTS

| | | | | |
|---|---|---|---|---|
| 2014/0052329 A1* | 2/2014 | Amirpour | ............. | G07C 5/008 |
| | | | | 701/29.6 |
| 2015/0332522 A1* | 11/2015 | Komada | ............. | G01M 17/007 |
| | | | | 701/29.1 |
| 2017/0050590 A1* | 2/2017 | List | ............. | B60W 40/12 |
| 2018/0075538 A1* | 3/2018 | Konrardy | ............. | B60Q 9/00 |
| 2019/0010888 A1* | 1/2019 | Kaserer | ............. | F02D 41/2467 |
| 2022/0005291 A1* | 1/2022 | Konrardy | ............. | G07C 5/008 |

FOREIGN PATENT DOCUMENTS

| | | | | | |
|---|---|---|---|---|---|
| DE | 19911049 | A1 | | 9/2000 | |
| DE | 10205014 | A1 | * | 11/2002 | ............. G07C 5/008 |
| DE | 102004058359 | A1 | | 7/2005 | |
| DE | 102004053042 | A1 | | 5/2006 | |
| DE | 102011116730 | A1 | | 4/2012 | |
| DE | 102012019301 | A1 | | 4/2014 | |

OTHER PUBLICATIONS

International Search Report and Written Opinion for International Application PCT/EP2018/075597, dated Dec. 12, 2018, 9 pages.

\* cited by examiner

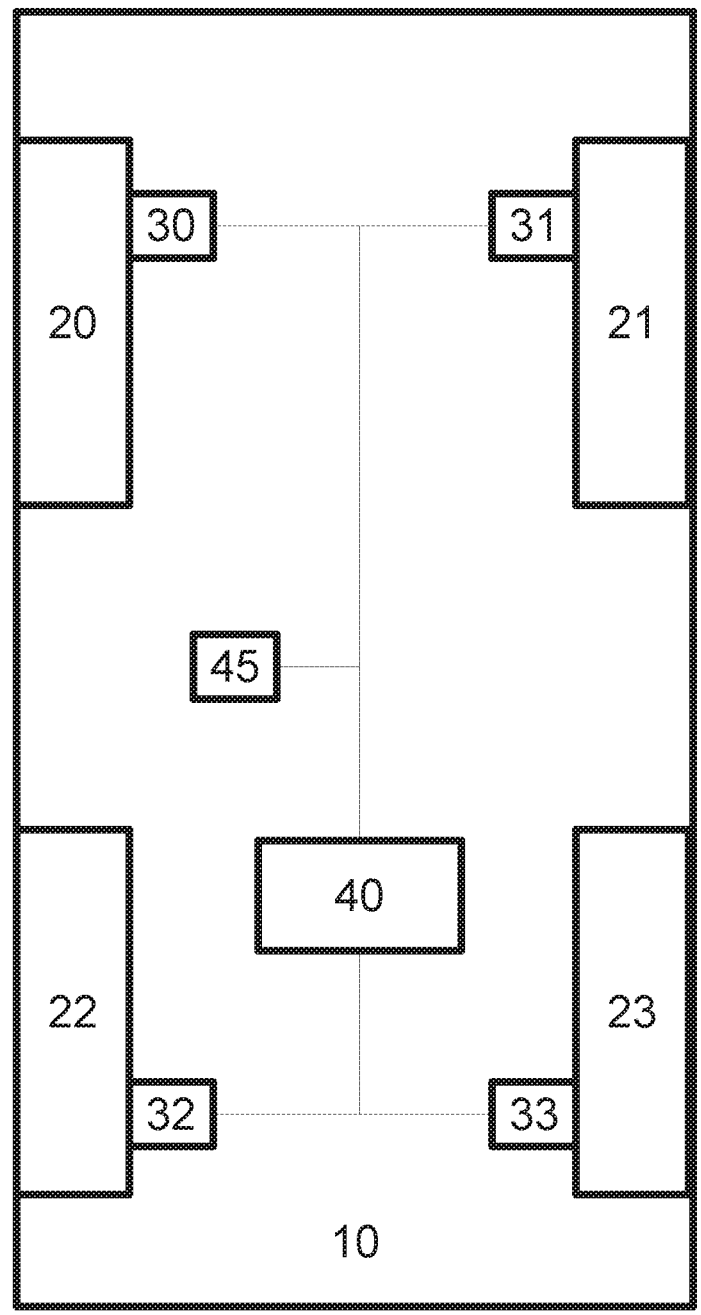

METHOD FOR DETERMINING THE VALUES OF PARAMETERS

CROSS REFERENCE TO RELATED APPLICATIONS

This application is the U.S. National Phase Application of PCT International Application No. PCT/EP2018/075597, filed Sep. 21, 2018, which claims priority to German Patent Application No. 10 2017 218 703.4, filed Oct. 19, 2017, the contents of such applications being incorporated by reference herein.

FIELD OF THE INVENTION

The invention relates to a method for determining the values of parameters for a controller of a vehicle.

BACKGROUND OF THE INVENTION

A very wide range of algorithms that use a vehicle dynamics model are used in modern vehicles. Such models are typically adapted to the structural condition of the respective vehicle. To this end, parameters are typically given vehicle-specific values.

It is known in the prior art that vehicle dynamic parameters, the values of which are different depending on the vehicle or respectively vehicle type, are nowadays typically programmed during the manufacture of a vehicle. For example, this can take place at the end of a line for producing the vehicle, wherein values are assigned to the parameters. The same hardware, for example an electronic control unit (ECU), is typically used in different vehicle models and adapted by the programming just described to the respective vehicle model.

However, there is a risk with the procedure just described, during the assignment of values to parameters, of false parameters being programmed, which can lead to erroneous values being used in the vehicle dynamics model and the problems associated therewith. Monitoring the assignment of values requires a considerable amount of work during production, in particular during the manufacture of numerous different models and model variants by means of just one line, which is standard practice in the automotive industry.

Document DE 10 2004 053 042 A1, incorporated herein by reference, discloses a method for controlling a drive train of a motor vehicle, in which a drive train is established on the basis of saved operating parameters.

Document DE 195 06 296 C1, incorporated herein by reference, discloses a method for establishing the type of gearbox, in which a type of gearbox is established based on sensor data.

Document U.S. Pat. No. 5,948,033, incorporated herein by reference, discloses a control device for automatically identifying a transmission.

SUMMARY OF THE INVENTION

Therefore an aspect of the invention is a method for determining the values of parameters for a controller of a vehicle, which has an alternative design compared with the embodiments according to the prior art.

An aspect of the invention relates to a method for determining the values of parameters for a controller of a vehicle, wherein the method has the following steps:

providing a plurality of sets of values, wherein each set of values has a number of values of the parameters,
driving a test route with the vehicle, recording a number of operating variables of the vehicle in the process,
calculating a plurality of error measures as a function of the parameters and the operating variables, wherein each error measure is calculated using the values of a respective set of values for the parameters,
selecting a set of values on the basis of the error measures, and
using the values of the selected set of values for the parameters.

Thanks to the procedure just described it is no longer necessary to carry out a previously defined value assignment for a specific vehicle model or a variant. Rather, the assignment of the values can take place during operation or respectively following manufacture, which significantly reduces the outlay during manufacture and possible sources of error.

In particular, the term "test route" is not to be construed here in the sense of a route which is not open to the public and which is usually utilized for testing vehicles and for the related product development. Rather, the test route is to be construed here, for example, as a driving route which does not have to be known in advance. It serves in particular to make possible analysis in a new vehicle, but not during development.

According to a possible embodiment, the set of values which produces the smallest error measure is selected. As a result, the set of values which obviously best suits the vehicle can be used.

The sets of values are preferably allocated to different types or models of vehicles. For example, these can be different model ranges of a manufacturer, which can cover different sizes or basic types of vehicles, for example. The respective model ranges can for example include different body variants such as sedan, station wagon, convertible, coupé or sport utility vehicle. Such different types or models can be distinguished by means of the method described herein.

The sets of values can, according to a preferred embodiment, be provided by programming during the manufacture of the vehicle or the controller. For example, the appropriate program code can be installed during the manufacture of the vehicle, for example on the line. It can also already be previously downloaded during separate manufacture or further processing of a controller module or another controller or can already be hard-wired in the controller.

According to a preferred embodiment, the test route is driven immediately following the manufacture of the vehicle. This makes it possible to quickly assign the correct values, meaning that the full functionality of the vehicle's controller is available as quickly as possible. The test route can in particular also be a test route for product testing following the manufacture of the vehicle. Such test routes are typically predefined for the conclusion of the production process, wherein various vehicle functions are checked. For example, the test route can be driven on test rigs or in-house terrains.

The error measures are preferably at least partially calculated during the execution of vehicle functions which are executed during the operation of the vehicle. Such vehicle functions have frequently already implemented mechanisms for calculating error measures which can, for example, serve to check the functionality during operation.

The error measures can also be at least partially calculated by a number of error determination algorithms provided especially for this purpose. For example, these can be residues. As a result, error determination algorithms can be used which are especially optimized for selecting or respectively determining the correct values for the parameters in question.

It is understood that the use of error measures which are calculated during the execution of vehicle functions, and the use of especially provided error determination algorithms can also be combined.

According to an embodiment, a part of the parameters is exclusively used in the error determination algorithms. This can in particular mean that a part of the parameters is no longer used in other vehicle functions, that is to say for example following the conclusion of the step of selecting a set of values. In particular, it can be provided that such parameters are not used in vehicle dynamics models which serve to control the vehicle. As a result, parameters can be provided especially for as rapid and efficient a selection of the values as possible.

The error measures can, according to respective embodiments, be calculated at least partially by Kalman filters, particle filters, estimation methods or neural networks. The use of such calculation methods has proven to be advantageous in practice.

According to an advantageous embodiment, the operating variables are checked prior to the error calculation in an initial diagnosis. As a result, it can for example be established whether the operating variables lie in an expected range of values. Erroneous operating variables, which can arise for example in the event of malfunctions, which therefore lie for example outside of the expected range of values, can be eliminated. This can improve the performance of the method.

The selected set of values can, for example, be selected by gradually eliminating sets of values, wherein the set of values having the greatest error measure is eliminated in each case. As a result, sets of values can in each case be gradually eliminated, for example after defined times and/or after defined driven distances, until only one set of values remains, which is then used.

According to a possible embodiment, the set of values which produces the lowest error measure is selected after a predefined time or a predefined route. It is possible to dispense with a gradual elimination.

According to an aspect of the invention, a number of further vehicle functions are deactivated during the execution of the method. These can, for example, be vehicle functions which are reliant on the assignment of values to parameters, which are determined by means of the method described here. Due to the deactivating of further vehicle functions, computing capacity can be freed up for the performance of the method described herein.

The parameters can at least be partially selected from the following group:
length of the vehicle,
width of the vehicle,
wheelbase of the vehicle,
track width of the vehicle,
mass of the vehicle,
center of gravity of the vehicle,
steering characteristic curve of the vehicle,
slip angle of the wheels of the vehicle,
aerodynamic drag coefficient of the vehicle,
body shape of the vehicle.

With such parameters it has been shown that they particularly depend on vehicle models or vehicle types and can be easily determined by means of the method described herein.

The operating variables can at least be partially selected from the following group:
position, determined by satellite navigation,
driving route, determined by satellite navigation,
speed, determined by satellite navigation,
acceleration, determined by satellite navigation,
wheel speeds,
acceleration, determined by vehicle sensor technology,
yaw rate, determined by vehicle sensor technology,
rotation rate, determined by vehicle sensor technology.

Such operating variables have proven to be particularly advantageous for the embodiment of the method described herein.

It is understood that in the case of the lists indicated herein, in particular of parameters and operating variables, any combination or sub-combination of the indicated features can be effected.

In general, it should be mentioned that, for example in a corresponding unit or respectively a controller module, sets of parameters or sets of values can be recorded for all eligible vehicles in which the corresponding unit can or could be installed or respectively where such an installation is planned. Which set of parameters or set of values is used can in particular be selected by means of error models after starting the unit for the first time and a corresponding driving route. The set of parameters or set of values which leads to the smallest total error is typically selected.

Different procedures can, for example, be used during this. The actual algorithm can be used, for example, and calculated with all the combinations of parameters or respectively combinations of values from the stored list of the sets of parameters or sets of values. The set of parameters or respectively set of values, which achieves the smallest deviations, can subsequently be used. Alternatively, a special algorithm can also be used, for example, which only serves to distinguish the different vehicle variants. To this end, additional parameters can also for example be stored in the list of parameters, which only serve to distinguish the corresponding vehicle variants.

In order to detect the errors, different methods can be applied. For example, Kalman filters, particle filters or similar estimation methods, which already calculate deviations or respectively magnitudes of error internally anyway, can be used. Such internal variables can be guided outwardly and are used to evaluate errors of the different sets of parameters or sets of values. Furthermore, error detection methods such as, for example, residues can be deployed, in order not to detect "errors" during ongoing operation, but in order to evaluate the deviations of the different sets of parameters or sets of values. This approach is particularly suitable if special algorithms are to be used to determine the vehicle model. In addition, neural networks can be trained, for example, which have the sole task of detecting the deviation due to the different sets of parameters or sets of values. It is understood that the indicated procedures can also be combined as desired.

The errors are ideally recognized where analytical redundancy exists for variables, that is to say in those locations where one and the same variable can be established in different ways and/or with different input variables. However, it is advantageous if, beforehand, it is ensured that the input variables are plausible, for example by self-diagnosis of the respective inputs.

In order to be able to reliably detect the errors, ways of maneuvering the vehicle which arise before the vehicle is handed over to the customer can, for example, be used. For example, it is even possible to specify extra dedicated maneuvers which must be performed in order to be able to distinguish the individual vehicle types. This can still be effected, for example, in a factory.

The final set of parameters or set of values can be selected in different ways. For example, sets of parameters or respectively sets of values having errors, which are greater than the errors of other sets of parameters or respectively sets of values, can be excluded step by step until only one set of parameters or set of values remains. The advantage of this approach is that more time remains for the final selection where multiple sets of parameters or sets of values may possibly lead to very similar results or which do not yet differ in a relevant manner during the first maneuvers driven. In addition, the set of parameters or set of values which has the lowest checksum errors, average errors, error medians or other variable can be selected, for example, after a fixed time or respectively after a distance has been driven. The advantage of this approach is that all the sets of parameters or sets of values are evaluated under the same vehicle dynamics stimuli.

The computing time additionally required for the selection, compared with normal operation, can in particular be provided in that other functionalities are not enabled until such time as the set of parameters or respectively set of values has been determined, for example because they are based on the results of the (functioning) vehicle dynamics algorithm.

Thanks to the approach described herein, it is no longer necessary to program appropriate parameters or values individually at the end of the line, saving time and thus costs and reducing the number of error sources in production.

If the parameters or values are not programmed at the end of the line, but are realized via different part numbers of the unit, a multiplicity of vehicles can be covered with just one part number with the approach described.

The invention furthermore relates to a controller or respectively a control module, which controller or respectively which control module is configured to perform the method according to the invention. The invention also relates to a vehicle which is configured to perform the method according to the invention, for example a vehicle having a controller module according to the invention. Furthermore, the invention relates to a non-volatile computer-readable storage medium on which program code is stored; when said program code is run a processor executes a method according to the invention. With respect to the method according to the invention, recourse can be had in each case to all of the embodiments and variants described herein.

BRIEF DESCRIPTION OF THE DRAWINGS

The person skilled in the art will infer further features and advantages from the embodiment example which is described below with reference to the appended drawing, wherein:

The FIGURE shows a vehicle for performing a method according to the invention.

DETAILED DESCRIPTION OF THE PREFERRED EMBODIMENTS

The FIGURE shows a vehicle 10 which is configured to perform a method according to the invention. It is understood that the vehicle 10 is merely represented schematically here and only inasmuch as it is relevant to the description of the invention.

The vehicle 10 has a left front wheel 20, a right front wheel 21, a left rear wheel 22 and a right rear wheel 23, with which the vehicle can move over the ground in the known manner. An engine, which is not represented and which drives at least a part of the wheels 20, 21, 22, 23, is used for this purpose.

A respective wheel speed sensor 30, 31, 32, 33 is allocated to each of the wheels 20, 21, 22, 23. As a result, the respective speeds of the wheels 20, 21, 22, 23 can be determined.

The vehicle 10 additionally has a controller 40 which executes various central vehicle functions such as, for example, driving assistance functions which are based on a vehicle dynamics model. The vehicle dynamics model contains multiple parameters to which values are to be allocated such that the corresponding vehicle dynamics model functions properly. The values depend on the type and the model of the vehicle 10.

The vehicle 10 additionally has a sensor cluster 45, in which various acceleration sensors as well as navigation functions such as satellite navigation are housed.

The wheel speed sensors 30, 31, 32, 33 as well as the sensor cluster 45 are communicatively connected to the controller 40. To this end, a known CAN bus can be used for example. The sensor cluster 45 can also be wholly or partially integrated into the controller 40.

The wheel speeds of the wheels 20, 21, 22, 23 as well as the acceleration and navigation data constitute operating variables of the vehicle 10, which are assessed immediately following the manufacture of the vehicle 10 in the way described below.

No values are yet allocated to the described parameters of the controller 40 in the initial state, that is to say immediately following the manufacture of the vehicle 10. Rather, a plurality of sets of values are stored in the controller 40, wherein each set of values corresponds to a specific vehicle type or respectively vehicle model. Depending on what type of vehicle the vehicle 10 is, i.e. how it was manufactured, one of the stored sets of values is most suited.

Immediately following the manufacture of the vehicle 10, a defined test route is driven with said vehicle, which test route can in particular be driven by means of an in-house course and/or a test rig. As a result, it is possible to prevent the vehicle 10 taking part in possibly dangerous road traffic when the controller 40 or respectively the value assignment is still in an unfinished state. The test route can, however, also be the first driving route after the vehicle has been sold by the dealer. In this case, the driver is then preferably to be informed accordingly that the controller may not yet be fully functional.

An error measure, which is produced as a sum of errors of multiple vehicle functions, is calculated by means of the operating variables indicated. Error measures are calculated in parallel for each of the stored sets of values such that the error measures which generate the respective sets of values can be compared.

Those sets of values which generate the highest error measure in each case at the respective time are now gradually eliminated at specific intervals. Finally, the set of values which generates the lowest error measure remains and which is, consequently, most suited to the vehicle 10. It is to be assumed that this is the set of values which is provided for the appropriate vehicle type or respectively the vehicle model.

It should be mentioned that the set of values which has the lowest error measure at that time can alternatively be selected following a defined time or a defined distance. As a result, a gradual elimination can be avoided.

It is understood that, in the present case, it may also be said that the system defined by the parameters and the totality of the operating variables has a certain overdetermination. Consequently, it is possible to also calculate errors if the parameters are not yet fixed at defined values. This in turn makes it possible to determine the values for the parameters by comparing the errors.

The approach described can in particular prevent false sets of values being assigned to the parameters during the production method. The associated outlay can also be reduced since the controller 40 can be designed for a multiplicity of vehicle types or vehicle models and even executes the necessary configuration functions.

The indicated steps of the method according to the invention can be executed in the indicated order. They can, however, also be executed in another order. The method according to the invention can be executed in one of its embodiments, for example with a specific combination of steps, such that no further steps are executed. However, further steps can essentially also be executed, including those which are not indicated.

The claims which form part of the application do not constitute a waiver of the attainment of more extensive protection.

If in the course of the proceedings it transpires that a feature or a group of features is not absolutely necessary, then the applicant here and now seeks a wording of at least one independent claim, no longer having the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of the invention, which are described in the various embodiments or exemplary embodiments and/or shown in the FIGURES, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

The invention claimed is:

1. A method for determining values of parameters for a controller of a vehicle, the method comprising:
providing a plurality of sets of values to a vehicle controller of the vehicle, wherein each set of values has a number of values of the parameters, wherein the sets of values are allocated to vehicle dynamic models of different body types of vehicles produced by a vehicle manufacturer, the parameters are indicative of physical characteristics of the different body types of the vehicles produced by the vehicle manufacturer;
driving a test route with the vehicle, and recording, by the vehicle controller, a number of operating variables of the vehicle in the process;
calculating, by the vehicle controller, a plurality of error measures as a function of the parameters and the operating variables, wherein each error measure is calculated using the values of a respective set of values for the parameters;
selecting, by the vehicle controller, a set of values on the basis of the error measures; and
controlling, by the vehicle controller, the vehicle using the values of the selected set of values for the parameters.

2. The method according to claim 1, wherein the set of values which produces the smallest error measure is selected.

3. The method according to claim 1,
wherein the sets of values are provided by programming during the manufacture of the vehicle or the controller.

4. The method according to claim 1,
wherein the test route is driven immediately following the manufacture of the vehicle and/or is a test route for product testing following the manufacture of the vehicle.

5. The method according to claim 1,
wherein the error measures are at least partially calculated during the execution of vehicle functions which are executed during the operation of the vehicle.

6. The method according to claim 1,
wherein the error measures are at least partially calculated by a number of error determination algorithms provided especially for this purpose.

7. The method according to claim 6,
wherein a part of the parameters is exclusively used in the error determination algorithms.

8. The method according to claim 1,
wherein the error measures are at least partially calculated by Kalman filters, particle filters, estimation methods or neural networks.

9. The method according to claim 1
wherein the operating variables are checked prior to the error calculation in an initial diagnosis.

10. The method according to claim 1,
wherein the selected set of values are selected by eliminating sets of values at intervals, wherein the set of values having the greatest error measure is eliminated in each of the intervals until the set of values which produces the smallest error measure is selected.

11. The method according to claim 1,
wherein the set of values which produces the lowest error measure is selected after a predefined time.

12. The method according to claim 1, wherein the parameters are at least partially selected from the group consisting of:
a length of the vehicle,
a width of the vehicle,
a wheelbase of the vehicle,
a track width of the vehicle,
a mass of the vehicle,
a center of gravity of the vehicle,
a steering characteristic curve of the vehicle,
a slip angle of the wheels of the vehicle,
an aerodynamic drag coefficient of the vehicle, and
a body shape of the vehicle.

13. The method according to claim 1, wherein the operating variables are at least partially selected from the group consisting of:
a position, determined by satellite navigation, a driving route, determined by satellite navigation,
a speed, determined by satellite navigation,
an acceleration, determined by satellite navigation,
a wheel speeds,
an acceleration, determined by vehicle sensor technology,
a yaw rate, determined by vehicle sensor technology, and
a rotation rate, determined by vehicle sensor technology.

\* \* \* \* \*